United States Patent [19]

O'Halloran et al.

[11] 4,136,286
[45] Jan. 23, 1979

[54] ISOLATED ELECTRICAL POWER GENERATION SYSTEM WITH MULTIPLE ISOCHRONOUS, LOAD-SHARING ENGINE-GENERATOR UNITS

[75] Inventors: William J. O'Halloran; James Trombley, Jr., both of Fort Collins, Colo.

[73] Assignee: Woodward Governor Company, Rockford, Ill.

[21] Appl. No.: 812,995

[22] Filed: Jul. 5, 1977

[51] Int. Cl.² ............................ H02J 3/46; H02P 9/04
[52] U.S. Cl. ........................................ 307/57; 307/47; 307/51; 307/87; 290/40 C; 415/17
[58] Field of Search ..................... 307/117, 43, 47, 52, 307/57, 62, 86, 87, 18, 19, 59; 322/17, 20, 33, 34, 7, 8; 310/113; 290/40 A, 40 C, 40 E, 40 R; 318/99

[56] References Cited

U.S. PATENT DOCUMENTS

| | | | |
|---|---|---|---|
| 3,748,491 | 7/1973 | Barrigher | 290/40 C |
| 3,902,076 | 8/1975 | Meyers | 307/57 |
| 3,986,038 | 10/1976 | Short | 307/47 |

*Primary Examiner*—L. T. Hix
*Assistant Examiner*—S. D. Schreyer
*Attorney, Agent, or Firm*—Leydig, Voit, Osann, Mayer & Holt, Ltd.

[57] ABSTRACT

An isolated electrical power generation system is described with multiple isochronous, load-sharing engine-generator units. The system includes load sensing means for generating a signal representing the individual power output of each engine-generator unit, means for generating a signal representing the total power output of all the engine-generator units in the system, and load-sharing means responsive to deviations between each individual power output signal and the total power output signal for controlling the fuel inputs to the respective engines in the various units. A load simulating means responds to the occurrence of a preselected condition, such as an excessive temperature, in an individual unit for adding a simulated power output signal to the individual power output signal for that particular unit. This reduces the fuel input unit to that particular unit without reducing the total power output signal, thereby avoiding a reduction in the fuel inputs to the other units and a resultant reduction in the frequency of the power output of the system.

5 Claims, 3 Drawing Figures

ISOLATED ELECTRICAL POWER GENERATION SYSTEM WITH MULTIPLE ISOCHRONOUS, LOAD-SHARING ENGINE-GENERATOR UNITS

DESCRIPTION OF THE INVENTION

The present invention relates generally to isolated electrical power generation systems, and particularly to such systems having multiple isochronous (constant speed), loadsharing engine-generator units. This type of power generation system is generally used where a self-contained power system is needed, such as on offshore oil drilling platforms, for example.

In power generation systems of this type, the power output of each engine-generator unit is normally controlled by means of an automically actuatable valve which controls the fuel input to each engine. To control these fuel valves, a load sensor monitors the power output of each unit and generates a signal which is continuously compared with a signal representing the load on all the other units to determine when the proportional share of the load for any one unit increases or decreases. Any deviation in the output of a given unit from its proportional share of the load generates control signals which effect adjustment of the fuel valves to bring all the units into balance with each other, i.e., to maintain a proportional distribution of the total system load among all the engine-generator units. This type of load-sharing system is conventional and well known in the art.

It is also known in the art to monitor the temperatures of the engines driving the generators so that the normal control signals fed to the fuel valve actuators can be overridden to prevent an excessive temperature increase in any given engine. However, whenever the fuel input to any engine is decreased in order to reduce an excessive temperature rise in that engine, the resulting decrease in the power output of that engine-generator unit reduces the signal representing the load on that particular unit. This in turn causes the fuel input to all the other engines to be decreased in order to keep the units in balance with each other, which reduces the speed of the generators with a resultant undesirable drop in the frequency of the total power output of the system.

It is, therefore, a primary object of the present invention to provide improved frequency stability in the power outut of an isolated electrical power generation system which has multiple isochronous, load-sharing engine-generator units, and which also has an overriding control feature for protecting the individual units from excessive temperatures or the like.

A more specific object of the invention is to provide such a power generation system with an improved control system which prevents an override condition in the control of any one engine from causing a reduction in the frequency of the power output of the system.

Other objects and advantages of the invention will be apparent from the following detailed and the accompanying drawings, in which.

While the invention has been shown and will be described in some detail with reference to specific, exemplary embodiments, there is no intention that it thus be limited to such details. On the contrary, it is intended to cover all modifications, alternatives and equivalents falling within the scope of the invention as defined by the appended claims.

Figure 1:
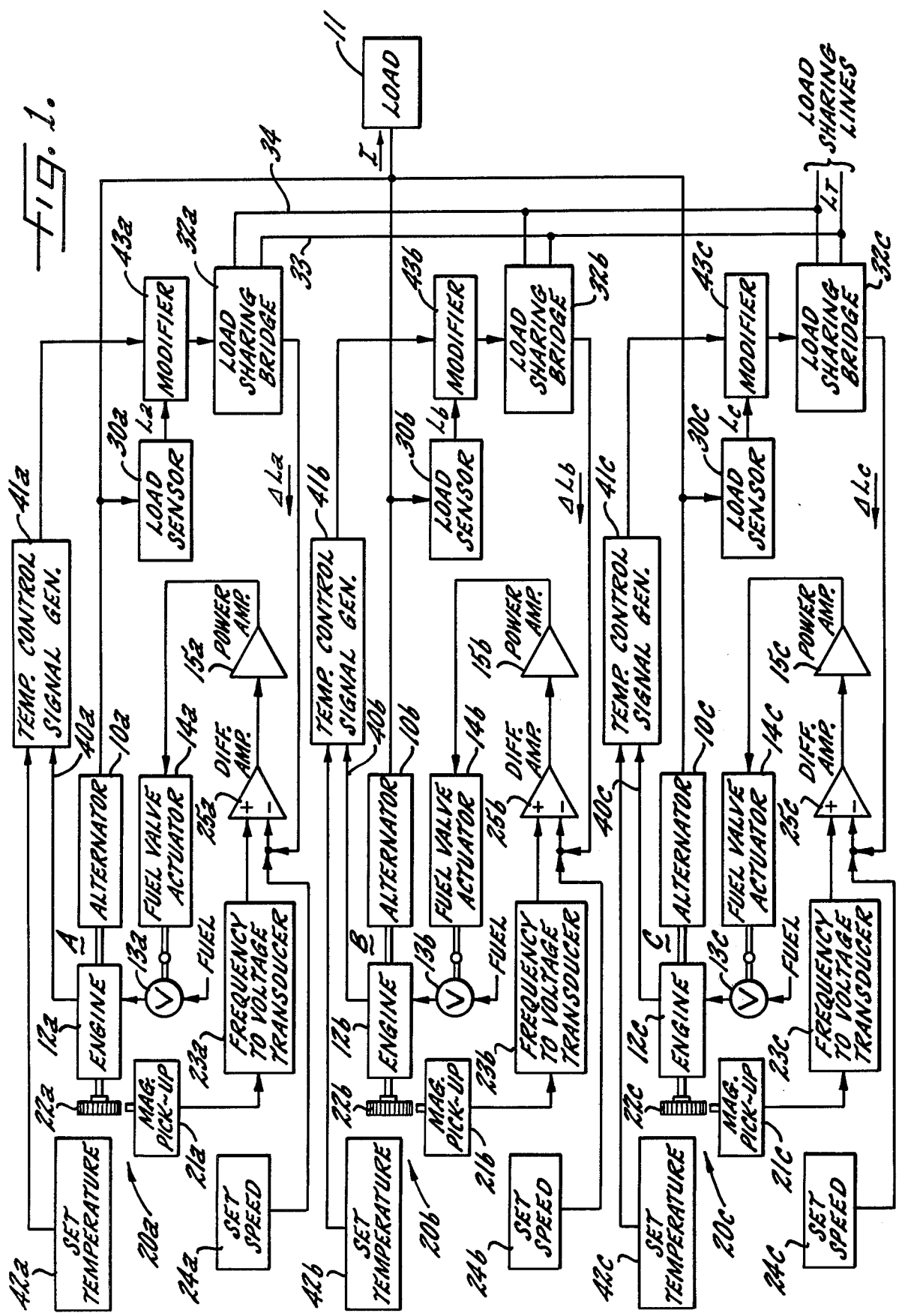
FIG. 1 is a schematic block diagram of a power generation system having three isochronous, load-sharing engine-generator units and a control system embodying the invention.

Turning now to the drawings and referring first to FIG. 1, there is shown an isolated electrical power generation system having three engine-alternator units, A, B and C with three paralleled alternators 10a, 10b and 10c supplying power to a variable electric load 11 which may comprise various lights, motors, heaters and other appliances which are turned on and off in random combinations from time to time. The load 11 thus draws alternating current I which changes in amplitude according to the conditions in the load but which from instant to instant varies in sinusoidal fashion characteristic of a-c. circuits. The phase angle between the generated voltage E and the load current I is also variable according to the nature of the energized units within the load 11. As is well known, the rate of transfer of energy (expressed in watts or kilowatts) from the alternators 10 to the load 11 is equal to $EI \cos \theta$, where $\cos \theta$ is the "power factor."

The three alternators 10a, 10b, 10c in the illustrative system are driven by three engines 12a, 12b, and 12c supplied with fuel through three independently controllable valves 13a, 13b and 13c, respectively, which form part of a speed governing system. Each of these valves 13 is controlled by a separate fuel valve actuator 14a, 14b or 14c which is responsive to an electrical control signal received from a corresponding power amplifier 15a, 15b or 15c. The position of the fuel valve 13 is determined by the voltage or current excitation applied to the actuator 14 and controls the rate of fuel input to the engine 12. As the valve 13 is opened or closed in response to increases or decreases in a position command signal supplied from the amplifier 15, the engine 12 tends to increase or decrease in its operating speed. On the other hand, as the torque exerted by the alternator 10 increases or decreases, the speed of the engine 12 tends to decrease or increase if the valve position and rate of fuel input remain the same.

As is well known to those familiar with the art of load-sharing governor control of paralleled alternators, the fuel valves 13 of the multiple engines 12 are generally controlled to maintain a proportional distribution of load among all the units by continuously monitoring the actual speed of each engine and comparing a signal representing that actual speed with a reference speed signal. The reference speed signal for each unit generally comprises two components, one of which represents a nominal reference and the other of which represents any deviation in the actual power output of an individual alternator from its proportional share of the total load. It is the purpose of the speed governing system to maintain the speed of the engines 12 and the alternators 10 at the value represented by the reference speed signal at any given time. When the torque of the alternators 10 increases or decreases due to a change in the load 11, causing the actual speed to increase or decrease, the governor readjusts the valves 13 to restore the speeds of all the units to the value represented by the reference speed signal and thereby maintain the generated a-c. power at a substantially constant frequency. At the same time, the continuous comparison of the load on each individual unit with the load on the other units ensures that the total system load is proportionally distributed among all the units.

In the illustrative system shown in FIG. 1, the actual speeds of the three engines 12 are monitored by magnetic pickup devices 20a, 20b and 20c for producing actual speed signals in the form of voltages which vary in accordance with changes in the speeds of the engine output shafts. For this purpose, magnetic pickup pulse generators 21a, 21b and 21c are disposed in cooperative spaced relation to gear or toothed wheels 22a, 22b and 22c driven directly by, or in timed relation to, the rotating shafts of the engines 12a, 12b and 12c, respectively. As each tooth of the wheel 22 passes the corresponding magnetic pickup pulse generator 21, one signal or pulse is created and fed as an input to a frequency-to-voltage transducer 23a, 23b or 23c. These transducers 23 generate the actual speed signals which vary in magnitude inversely according to changes in the frequency of their input signals and thus according to changes in the sensed speeds. The nominal reference speed signals for the three fuel valve actuators are derived from three manually adjustable "set speed" signal generators 24a, 24b and 24c, which may comprise adjustable potentiometers connected to a d-c. source.

Each pair of reference speed and actual speed signals are compared in one of three differential amplifiers 25a, 25b or 25c which generate speed control signals proportioned to the differences, if any, between the actual speed and reference speed signals. These speed control signals are amplified by the power amplifiers 15 and applied to the corresponding fuel valve actuators 14 to automatically adjust the fuel valve 13 to equalize the actual speeds with the reference speeds. Thus, whenever the speed of one of the engines 12 is below the reference speed so that the actual speed signal is less than the reference speed signal, the speed control signal for that engine becomes more positive and the corresponding actuator 14 shifts the valve 13 to a more open position. Conversely, when the speed of the engine 12 is above the reference speed so that the actual speed signal is greater than the reference speed signal, the speed control signal for that engine decreases to cause the actuator 14 to shift the corresponding value 13 to a more closed position.

For the purpose of distribution the electric load 11 proportionally among the three alternators 10, a third signal representing any deviation of the individual unit load from it proportional share of the total load is also supplied to each of the three amplifiers 25. Thus, in the system of FIG. 1, three load sensors 30a, 30b and 30c are coupled to the outputs of the correponding alternators 10a, 10b and 10c and generate signals $L_a$, $L_b$ and $L_c$ representing I cos $\theta$ for the load currents delivered by the respective alternators to permit comparison of their relative delivered power loads. The outputs of these load sensors 30 are fed into corresponding load-sharing bridges 32a, 32b and 32c, each of which is also connected to load-sharing or "paralleling" lines 33 and 34 carrying a signal representing the total power load $L_T$ on the three alternators 10. Each of the load-sharing bridges 32 compares the total power load signal $L_T$ from the load-sharing lines 33, 34 with the actual load signal from the corresponding load sensor 31 and produces an output signal $\Delta L$ representing any deviation of the actual load on that individual alternator from its proportional share of the total load on all three alternators. This output signal $\Delta L$ is algebraically summed with the set speed signal supplied to the corresponding amplifier 25 so that the set speed signal is, in effect, modulated to equalize the load on the corresponding alternator with its proportional share of the total load.

More specifically, if the load on the alternator 10a is below its proportional share, the load-sharing bridge 32a generates an output signal which increases the reference speed signal so that the amplifier 25a produces an output signal which causes the fuel valve actuator 14a to move the valve 13a in the opening direction, thereby increasing the torque generated by the engine 12a and increasing the power output of the alternator 10a. Conversely, if the load sensor 31a detects that the load on the alternator 10a is above its proportional share, the load-sharing bridge 32a generates a signal which reduces the reference speed signal so that the amplifier 25a produces an output signal which causes the actuator 14a to move the valve 13a in the closing direction. In either case, adjustment of the valve 13a continues until the load-sharing bridge 32a receives equal signals from the load sensor 32a and the paralleling lines 33, 34, indicating that the actual load on the alternator 10a is equal to its proportional share of the total load.

In accordance with the present invention, load simulating means responsive to the occurrence of a preselected condition in any of the individual engine-generator units adds a simulated load signal to the actual load signal for that unit so as to reduce the fuel input to that unit without reducing the total load signal, thereby avoiding a reduction in the fuel inputs to the other units and a resultant reduction in the frequency of the power output of the system. For example, in the case of a system having an override feature for protecting the engines from excessive temperatures, the occurrence of an excessive temperature produces a simulated load signal which reduces the fuel input to the overheated engine. This simulated load signal is added to the actual load signal for the overheated unit, thereby artificially increasing the total load signal on the paralleling lines to prevent the fuel inputs to the other units from being reduced to keep them in balance with the overheated unit. In other words, the load on the overheated unit is actually reduced by the simulated load signal, but this load reduction is not reflected in the total load signal on the paralleling lines. Consequently, as long as the other units do no overheat, they carry a disproportionately greater share of the system load than the overheated unit, thereby avoiding a reduction in the frequency of the total power output of the generating system.

Thus, in the illustrative system of FIG. 1, each of the engines 12 includes a thermocouple which generates a signal $T_s$ on line 40a, 40b or 40c representing the sensed engine temperature, typically the temperature of the exhaust gas or the turbocharger. This actual temperature signal $T_s$ is fed to a temperature control signal generator 41a, 41b, or 41c which also receives a reference temperature signal $T_s$ from a manually adjustable signal source 42a, 42b or 42c. Each signal generator 41 compares the respective reference temperature and actual temperature signals and produces an "excess temperature" output signal $T_e$ representing the integral of any difference between the two signals $T_s$ and $T_r$ due to an increase in the actual engine temperature above the selected reference temperature. This excess temperature signal $T_e$ is summed with the output signal $L_a$, $L_b$ or $L_c$ from the corresponding load sensor 31 in a modifier 43a, 43b or 43c, thereby artificially increasing the input signal to the corresponding load-sharing bridge 32. This output signal from the modifier 43 will be referred to herein as the "modified load" signal $L_{ma}$, $L_{mb}$, or $L_{mc}$.

Assuming that the temperature of the engine 12a increases above the preselected maximum temperature while that engine-generator unit A is sharing the total system load equally with the other units in parallel therewith, the resulting artificial increase in the modified load signal $L_{ma}$ supplied to the bridge 32a indicates that the overheated unit A is supplying a disproportionate share of the load. Consequently, the bridge 32a generates an output signal $\Delta L_a$ that causes the fuel input to the engine 12a to be reduced, thereby alleviating the excessive temperature condition in that engine. Meanwhile, the output signal from the bridge 32a also increases the total load signal $L_T$ that is supplied via lines 33, 34 to all the other engine-generator units, thereby indicating to the bridges 32b and 32c that the units B and C should be carrying a greater share of the load. This causes the bridges 32b and 32c to produce output signals that increase the fuel inputs to the engines 12b and 12c so that the units B and C assume a greater share of the total load to compensate for the load reduction on unit A. The end result is that the frequency of the power supplied by the total system is maintained at a constant value, in spite of the reduction in fuel input to one of the engines because of its excessive temperature.

Figure 2:
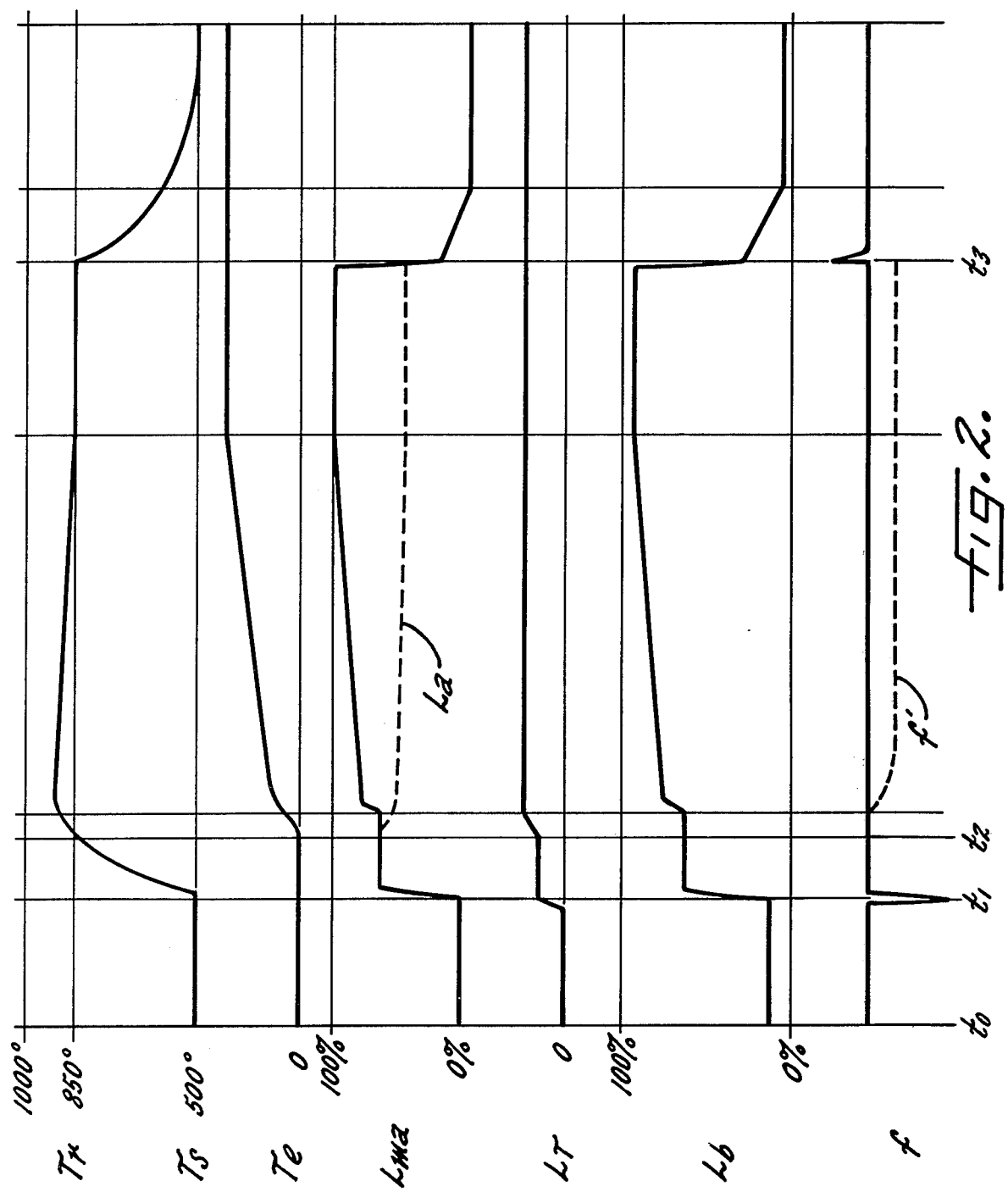
FIG. 2 is a series of electrical waveforms illustrating the operation of portions of the system shown in FIG. 1.

The effect of this load simulation produced in response to an excessive temperature condition can be understood more clearly by reference to the curves shown in FIG. 2. These curves illustrate the operation of an exemplary system which is set for a temperature limit of 850° F. It can be seen that the actual engine temperature $T_s$ remains stable at 500° F. from time $t_o$ until time $t_1$, at which point a substantial step load is added to the system. This step load causes the engine temperature $T_s$ to rise rapidly to about 900° F., which is above the selected maximum of 850° F. represented by the reference temperature signal $T_r$. As soon as the 850° F. maximum is exceeded, at time $t_2$, the temperature control signal generator 41 begins to produce an excess temperature signal $T_e$ which is the integral of the excess of $T_s$ beyond $T_r$. This signal $T_e$ is summed with the actual load signal $L_a$ in the modifier 43a to produce the modified load signal $L_{ma}$. It can be seen that the modified load signal $L_{ma}$ is the same as the load sensor output $L_a$ until shortly after the temperature limit is reached, at which point the modified load signal $L_{ma}$ exceeds the actual load sensor output $L_a$ (shown as a dashed line in FIG. 2) due to the addition of the excess temperature signal $T_e$. This artificially increased load signal $L_{ma}$ supplied to the bridge 32a indicates a load increase on unit A (albeit simulated rather than actual), thereby causing the bridge 32 to produce an output signal $\Delta L$ which initiates a reduction in the fuel input to engine 12a, to reduce the excessive temperature of that engine. At the same time, the bridge 32a causes the total load signal $L_T$ on the paralleling lines 33, 34 to increase slightly. This in turn increases the fuel inputs to the parallel units B and C and causes them to carry an increased load, as indicated, for example, by the load sensor output signal $L_b$ for unit B in FIG. 2. The end result is a substantially constant frequency output from the entire system, as represented by line f in FIG. 2. Without the load simulation signal, the excessive temperature condition would cause the power output of the system to "droop", indicated by the dashed-line curve f' in FIG. 2. At time $t_3$ the load is removed from the sytem, and all signals return to their zero or normal levels.

Figure 3:
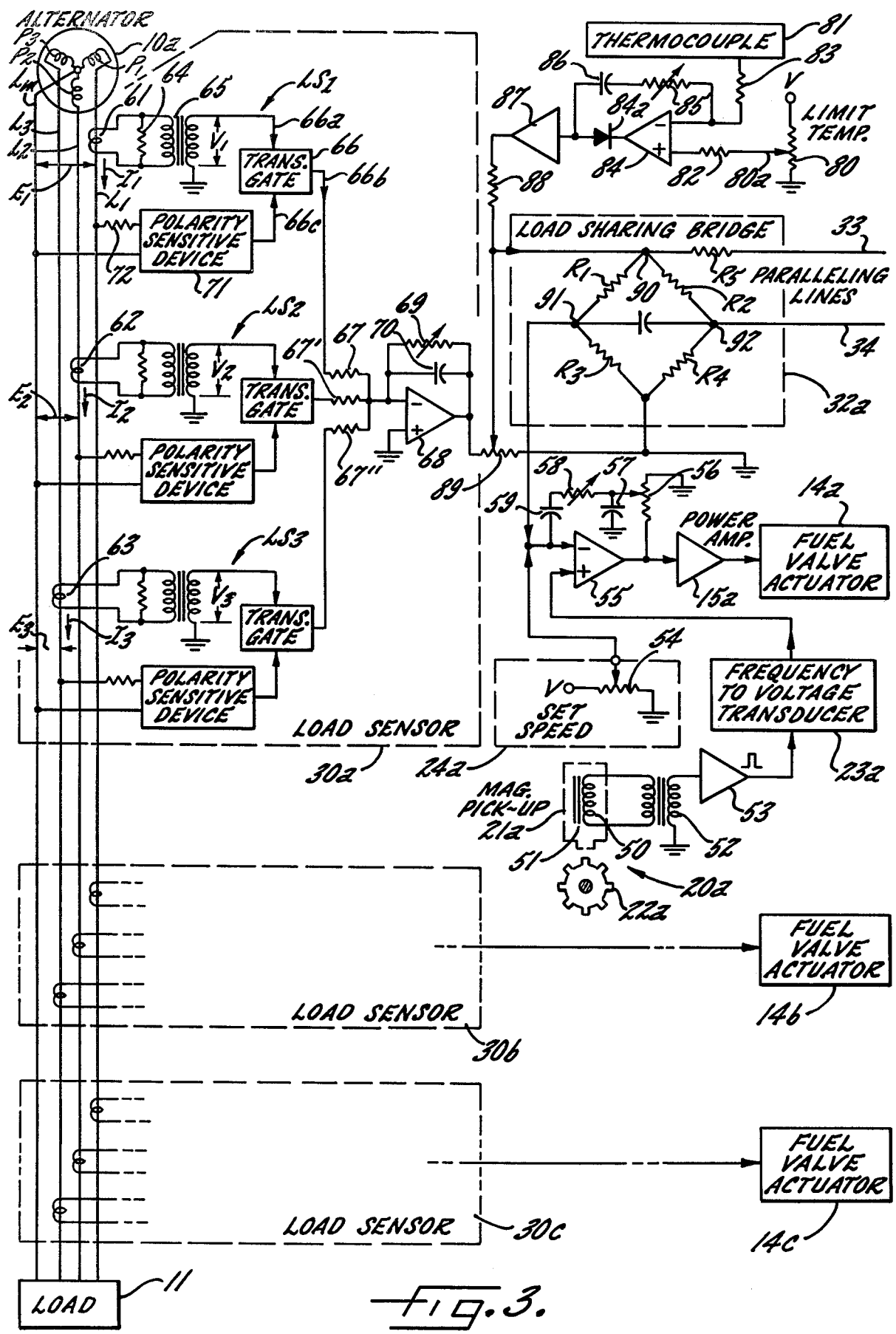
FIG. 3 is a more detailed schematic diagram of one specific example of the system illustrated in FIG. 1.

Turning next to FIG. 3, which shows one exemplary embodiment of a three-phase a-c. system in more detail, the magnetic pickup 20a is illustrated as constituted by a coil 50 disposed on a magnetically permeable core 51 closely spaced from the teeth of the wheel 22a. As each tooth passes the core 51, changes in magnetic flux linking in the coil 50 induce one cycle of an alternating signal, i.e., a small positive pulse followed by a small negative pulse. The output of the pickup is preferably applied through a transformer 52 to a pulse shaping amplifier 53 (which also acts as a unidirectional diode) whose output thus becomes a positive squarewave pulse corresponding to each passage of a tooth past the pickup 21a. The pickup pulses form the input to the frequency-to-voltage transducer 23a and, as noted above, these pulses vary directly in frequency or recurrence rate according to changes in the sensed speed of the engine 12a. One example of a suitable frequency-to-voltage transducer is described in detail in the assignee's copending U.S. Pat. application Ser. No. 738,354 filed Nov. 3, 1976 in the name of R. G. McConnell and entitled "Frequency-To-Voltage Transducer For Speed Governor Systems Or The Like."

As mentioned previously, the set speed signal is generated by a manually adjustable potentiometer 54 connected to a d-c. voltage source V. This set speed signal is modulated by the output of the load-sharing bridge 32a, and the resulting reference speed signal is then compared with the actual speed signal from the transducer 23a in a governor amplifier having proportional, integral, derivative (PID) response characteristics. As here shown, the reference speed signal is applied to the inverting input terminals, and the actual speed signal is applied to the non-inverting terminal, of an operational amplifier 55 through appropriate input resistors (not shown). The output of the operational amplifier 55 is coupled back to the inverting input through a potentiometer 56 working into a shunt capacitor 57, a rheostat 58 and a series capacitor 59. The potentiometer 56 creates a proportional term, the capacitor 57 creates a derivative term, and the capacitor 59 creates an integral term in the overall transfer function of the amplifier 55 – as is well known. Proportional gain action is generally adjusted by setting the potentiometer 56, while the gain for derivative action is generally adjusted by setting the rheostat 58. The output of the amplifier 55 thus forms a fuel valve position command voltage which is applied through the power amplifier 15a to the fuel valve actuator 14a. Whenever the speed of the engine 12a is below the reference point and the actual speed voltage is less than the reference speed voltage, the valve position voltage is less than the reference speed voltage, the valve position command voltage becomes more positive and the actuator 14a shifts the valve 13a in an opening direction. Conversely, when the speed of the engine 12a is above the reference point and the actual speed voltage is greater than the reference speed voltage, the valve position command signal decreases so that the actuator 14a shifts the valve 13a in a closing direction.

The illustrative load sensor 30a shown in FIG. 3 has three sensing and switching devices LS1, LS2, and LS3 which include current transformers 61, 62, and 63 associated with the three different phases P1, P2 and P3 of the output from the alternator 10a. Thus, the current transformer 61 associated with phase P1 is coupled to the load line L1 and supplies its output voltage through a resistor 64 so as to create an input voltage to the primary winding of a scaling transformer 65. As an example, the transformer 65 may be chosen such that its output voltage V1 varies proportionally over a range of 0 to ± 8 volts peak as the load current I1 takes on values from 0 to 100 amperes. The signal V1 thus is proportional to and represents the instantaneous value of the sinusoidal load current I1 in line L1.

The secondary winding of the transformer 65 is grounded at its lower end and connected from its upper end to the input of a transmission gate 66 having input and output terminals 66a, 66b with a control terminal 66c. The transmission gate 66 is a commercially available electronic component well known to those skilled in the art. It functions to transmit faithfully a variable voltage fed to its input 66a to its output 66b only when its control terminal 66c receives a relatively high control voltage, i.e., a control voltage that might be considered a "logic 1" level. On the other hand, when the control voltage is at a relatively low, "logic O" level, the transmission gate 66 is disabled so as to disconnect the input 66a from the output 66b. It will be understood, however, that when the transmission gate is enabled, the current-representing signal V1 for phase P1 is transmitted in its sinusoidal varying form to the terminal 66b and via an input resistor 67 to the inverting input of an operational amplifier 68 which operates as an averaging integrator. However, when the transmission gate 66 is disabled, the signal applied through the input resistor 67 is zero.

To create an averaging integrator, the operational amplifier 68 receives via the input resistor 67 the current-representing signal V1 on its inverting input terminal. The non-inverting input of the amplifier 68 is connected to reference or ground potential. A negative feedback path for the operational amplifier 68 includes a resistor 69 and a capacitor 70. As is well known, the magnitude of the resistor 69 in relation to that of the resistor 67 determines the net gain of the amplifier, while the capacitor 70 in the negative feedback path creates an integrating (e.g., filtering) characteristic in the overall transfer function of the amplifier 68. It will thus be understood that the output signal from the amplifier 68 varies as the time average of the input signal applied through resistor 67 to the inverting input terminal.

In order to couple the current-representing signal to the averaging amplifier 68 only when the voltage E1 is undergoing a particular or selected one of its two half cycles, a low voltage threshold polarity sensitive device 71 is connected to be responsive to the voltage E1 via resistor 72. One example of a polarity sensitive device suitable for use in this system is described in more detail in the assignee's copending U.S. Pat. application Ser. No. 744,764 filed Nov. 24, 1972 in the name of W. J. Schade et al and entitled "Improved AC. Power Sensor of the I Cos $\theta$." This device causes the illustrative sensor to supply the current-representing signal to the inverting input of the amplifier 68 only during particular half cycles of the alternating voltage E1. That is, when the line L1 is positive relative to the neutral line Ln, the potential at the control terminal 66c is low, and the transmission gate 66 is disabled. But during substantially the entire half cycles of the phase voltage when the line L1 is negative relative to line Ln, the control terminal 66c is at a relatively high voltage level, the transmission gate 66 is enabled, and the voltage of phase P1 is fed to the input resistor 67.

Because the operational amplifier 68 has an averaging or integrating characteristic created by the feedback capacitor 69, the output voltage would normally be a d-c. voltage varying in proportion to the changing product of I cos $\theta$ for phase P1. However because the current-representing voltage signal V1 is in phase with the current I1 of phase P1, and is transmitted to the resistor 67 only during negative half cycles of the voltage E1, the input signal at resistor 67 is negative in polarity and variable in magnitude when the current I1 is in phase with the voltage E1. Due to inversion in the amplifier 68, the amplifier output voltage is positive in polarity, increasing in magnitude in proportion to increasing load on the alternator 10a.

As indicated in FIG. 3, the apparatus associated with phase P1 of the three-phase a-c. output of the alternator 10 is duplicated for phases P2 and P3. The units designated LS2 and LS3 correspond exactly to the unit LS1 for phase P1, and each of the three supplies a separate outut signal to input resistors 67, 67' and 67", respectively. Since these three input resistors all lead in common to the inverting input terminal of the amplifier 68, the latter functions to algebraically sum the three input signals and to make the output voltage vary as the time average of that sum. If the three-phase load 11 is balanced and creates identical phase angles for the three phase currents, then the output voltage will vary according to the changing value of the quantity 3I cos $\theta$.

Turning next to the temperature limiting portion of the system shown in FIG. 3, a signal representing a preselected maximum permissible engine temperature (above which the engine is considered overheated) is derived from a potentiometer 80 excited from an appropriate d-c. voltage source having an adjustable wiper 80a upon which a reference temperature voltage appears. The magnitude of this voltage depends upon the adjusted position of the wiper 80a and may be changed from time to time by a human operator. Both the reference temperature signal from the potentiometer 80 and the actual temperature signal from an engine thermocouple 81 are applied via resistors 82 and 83, respectively, to an operational amplifier 84 which operates as an averaging integrator. Thus, the amplifier 84 receives via the input resistor 83 the actual temperature signal on its inverting input terminal, and the reference temperature signal is received via the input resistor 82 on its non-inverting input terminal. A negative feedback path for the amplifier 84 includes a resistor 85 and a capacitor 86, with the capacitor 86 producing an integrating characteristic, in the same manner described previously in connection with the amplifier 68.

Since the purpose of the temperature control signal to be derived from the amplifier 84 is to limit the temperature of the engine to values below the selected maximum or reference temperature, the amplifier 84 should produce an output only when the actual temperature signal exceeds the reference temperature signal. When the reference temperature signal exceeds the actual temperature signal, the engine is operating within a safe temperature range and no correction is needed. Thus, a diode 84a is connected to the output of the amplifier 84 to furnish an output signal only when the actual temperature is greater than the reference temperature, i.e., only when the actual temperature signal at the inverting input of the amplifier 84 is greater than the reference temperature signal at the non-inverting input. Whenever such an output signal is produced, it is passed through a power amplifier 87.

In keeping with the invention, any output signal from the power amplifier 87 is dropped across a resistor 88 for summation with the load signal from the output amplifier 68 of the load sensor, which is dropped across a potentiometer 89. The sum of these two signals is then applied to the bridge circuit 32a. Thus, whenever an excessive temperature condition exists, the only load signal seen by the bridge circuit 32a for the overheated unit is the modified load signal $L_{ma}$ comprising the sum of the actual load signal $L_a$ and the excess temperature signal $T_e$.

The ultimate output of the load sensor 30, modified by the output of the amplifier 87 in the event of an excessive temperature condition, is applied to the load sharing bridge 32a at a terminal 90 between resistors R1 and R2 which form two legs of the bridge. The other two legs of the bridge are formed by resistors R3 and R4. As mentioned previously, the purpose of the bridge 32a is to compare the modified load signal received at the terminal 90 with the total load on all the engine-alternator units as represented by the signal on the paralleling lines 33, 34 connected across the resistor R2.

To provide a balanced bridge circuit, R1 is made equal to R3 and R2 is made equal to R4. Thus, the voltage is normally the same at terminals 91 and 92. The output of the bridge is taken from terminal 91 and applied to the inverting input of the amplifier 55 along with the set speed signal from the potentiometer 54. As mentioned previously, it is this bridge output that causes each engine-alternator unit to take on its proportional share of the total system load. For example, assuming that unit A has a capacity of 100 kw and unit B has a capacity of 50 kw; the load sensor output for each unit is 9 volts at 100% load; the total system load is 75 kw; and only unit A is initially operating at 75% of its capacity, the voltage at terminal 90 is 6.75 volts. With 6.75 volts across the bridge, the voltage at terminals 91 and 92 is 3.375 volts; the difference between terminals 91 and 92 is zero; and the output of the bridge is zero. When unit B is placed in service, the difference in the outputs from the two load sensors 30a and 30b causes a current flow in the paralleling lines 33, 34 and the difference is dropped across resistors R5 connected to the terminals 90 in the load-sharing bridges for both units A and B. This causes an increase in the voltage across the resistor R2 in the bridge circuit 32b for unit B, and the resulting electrical imbalance of the bridge 32b results in a positive-going output at terminal 91, thereby causing an increase in the fuel input to the engine 12b. Similarly, the voltage across the resistor R2 in the bridge circuit 32a for unit A decreases, and the resulting imbalance of the bridge 32a results in a negative-going output at terminal 91, to cause a decrease in the fuel input to engine 12a.

This imbalance in the bridge circuits caused by the signal on the paralleling lines 33, 34 continues unitl the outputs from the two load sensors 30a and 30b are equal, indicating that the load is shared proportionally by the two units A and B. More specifically, the load sensor output is then 4.5 volts for each unit, indicating that the output of unit A is 50 kw and the output of unit B is 25 kw. Thus, both units are operating at 50% of their capacity.

If it is now assumed that unit A exceeds its temperature limit by an amount that requires the load on this unit to be reduced from 50 kw to 45 kw, the excess temperature signal from the amplifier 87 increases the signal from the load sensor from 4.5 volts to 4.95 volts, and it is this increased signal that is applied to terminal 90 of the load sharing bridge 32a. This is a 10% increase in the input signal to the bridge, thereby indicating that the load on the unit A has increased from 50% of capacity (50 kw) to 60% of capacity (60 kw). This causes an increase in the signal on the paralleling lines 33, 34 causing a corresponding increase in the output signal from the load sharing bridge 32b for unit B. The resulting bridge output signal of 4.95 volts for unit B causes the fuel to the engine 12b to be increased so as to increase the load carried by unit B from 50% of capacity (25 kw) to 60% of capacity (30 kw). Meanwhile, the voltage across the resistor R2 in the bridge circuit 32a for unit A decreases, and the resulting imbalance of this bridge causes a decrease in the fuel input to engine 12a so as to reduce the load on unit A from 50 kw to 45 kw. Thus, the resulting total load carried by the two units is still 75 kw, but it is distributed disproportionately between the two units as a result of the excessive temperature condition encountered in unit A.

As can be seen from the foregoing detailed description, this invention provides improved frequency stability in the power output of an isolated electrical power generator system which has multiple isochronous, load-sharing engine-alternator units, even though the system also has an overriding control feature for protecting the individual units from excessive temperatures or the like. By producing a simulated load signal for the particular unit in which an excessive temperature is detected, this improved system prevents the override condition from causing an unwarranted reduction in the load on the other unit, thereby avoiding a reduction in the frequency of the power output of the total system.

We claim as our invention:

1. In an isolated electrical power generation system having multiple isochronous, load-sharing engine-generator units including
    (1) load sensing means for generating a signal representing the individual power output of each engine-generator unit,
    (2) means for generating a signal representing the total power output of all the engine-generator units in said system, and
    (3) load-sharing means responsive to deviations between each individual power output signal and said total power output signal for controlling the fuel inputs to the respective engines in said units, the improvement comprising load simulating means responsive to the occurrence of a preselected condition in an individual unit for adding a simulated power output signal to the individual power output signal for the unit to reduce the fuel input to that unit without reducing said total power output signal, thereby avoiding a reduction in the fuel inputs to the other units and a resultant reduction in the frequency of the power output of the system.

2. An isolated electrical power generation system as set forth in claim 1 wherein said preselected condition is engine temperature.

3. An isolated electrical power generation system as set forth in claim 1 wherein said simulated power output signal represents the integral of any increase in the actual engine temperature above a preselected reference temperature.

4. An isolated electrical power generation system having multiple isochronous, load-sharing engine-generator units, said system comprising the combination of
(1) load sensing means for generating a signal representing the individual power output of each engine-generator unit,
(2) load simulating means responsive to the occurrence of a preselected condition in an individual unit for producing a simulated power output signal for that unit,
(3) summing means for adding said simulated power output signal to the actual power output signal for the unit in which said preselected condition occurs so as to produce a signal representing a power output higher than the actual power output of that unit,
(4) means for generating a signal representing the total power output of all the engine-generator units in said system, including said simulated power output signals for any units in which said preselected condition is present, and load-sharing means responsive to deviations between each individual power output signal, including said simulated signals, and said total power output signal for controlling the fuel inputs to the respective engines in said units.

5. An isolated electrical power generation system having multiple isochronous, load-sharing engine-generator units, said system comprising the combination of
(1) load sensing means for generating a signal representing the individual power output of each engine-generator unit,
(2) load simulating means responsive to the occurrence of a preselected condition in an individual unit for producing a simulated power output signal for that unit representing a power output higher than the actual power output of the unit,
(3) means for generating a signal representing the total power output of all the engine-generator units in said system, with said simulated power output signal being substituted for the actual power output signal of any unit in which said preselected condition has occurred, and
(4) load-sharing means responsive to deviations between each individual power output signal and said total power output signal for controlling the fuel inputs to the respective engines in said units.

* * * * *